United States Patent
Türk et al.

(10) Patent No.: US 10,294,444 B2
(45) Date of Patent: May 21, 2019

(54) FORMULATIONS, USE THEREOF AS OR FOR THE PRODUCTION OF DISHWASHING DETERGENTS, AND PRODUCTION THEREOF

(71) Applicant: BASF SE, Ludwigshafen (DE)

(72) Inventors: Holger Türk, Mannheim (DE); Heike Weber, Mannheim (DE); Gazi Türkoglu, Mannheim (DE); Alejandra Garcia Marcos, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 381 days.

(21) Appl. No.: 15/320,623

(22) PCT Filed: Jun. 12, 2015

(86) PCT No.: PCT/EP2015/063130
§ 371 (c)(1),
(2) Date: Dec. 20, 2016

(87) PCT Pub. No.: WO2015/197378
PCT Pub. Date: Dec. 30, 2015

(65) Prior Publication Data
US 2017/0145352 A1    May 25, 2017

(30) Foreign Application Priority Data

Jun. 23, 2014  (EP) .................................... 14173393

(51) Int. Cl.
| | | |
|---|---|---|
| *C11D 3/37* | (2006.01) | |
| *C08F 251/00* | (2006.01) | |
| *C11D 3/00* | (2006.01) | |
| *C11D 3/33* | (2006.01) | |
| *C11D 3/39* | (2006.01) | |
| *C11D 11/00* | (2006.01) | |
| *C11D 3/20* | (2006.01) | |

(52) U.S. Cl.
CPC .......... *C11D 3/3788* (2013.01); *C08F 251/00* (2013.01); *C11D 3/0036* (2013.01); *C11D 3/2086* (2013.01); *C11D 3/33* (2013.01); *C11D 3/3942* (2013.01); *C11D 11/0035* (2013.01)

(58) Field of Classification Search
CPC ................................................... C11D 3/3788
USPC ................................................. 510/400, 475
See application file for complete search history.

(56) References Cited

U.S. PATENT DOCUMENTS

| | | | |
|---|---|---|---|
| 8,574,374 B2 | 11/2013 | Hueffer et al. | |
| 2011/0118168 A1* | 5/2011 | Schunicht ............. | C08F 251/00 510/400 |
| 2013/0284210 A1* | 10/2013 | Hueffer ................. | C11D 7/3245 134/25.2 |
| 2017/0130168 A1* | 5/2017 | Turk ..................... | C08F 251/00 |
| 2017/0145352 A1* | 5/2017 | Turk ..................... | C08F 251/00 |

FOREIGN PATENT DOCUMENTS

| | | |
|---|---|---|
| CN | 102574961 A | 7/2012 |
| EP | 2138560 A1 | 12/2009 |
| WO | 2008095562 A1 | 8/2008 |
| WO | 2013056996 A1 | 4/2013 |
| WO | 2015197379 A1 | 12/2015 |

OTHER PUBLICATIONS

International Search Report for PCT/EP2015/063130. dated Jul. 17, 2015.
European Search Report issued in European Application No. EP 14 17 3393 dated Dec. 3, 2014.

* cited by examiner

*Primary Examiner* — Gregory E Webb
(74) *Attorney, Agent, or Firm* — Armstrong Teasdale LLP

(57) ABSTRACT

In a formulation used as or for the production of dishwashing detergents, the formulation includes
(A) at least one compound selected from aminocarboxylates,
(B) at least one graft copolymer composed of
  (a) at least one graft base selected from monosaccharides, disaccharides, oligosaccharides and polysaccharides, and side chains obtainable by grafting on of
  (b) at least one ethylenically unsaturated mono- or dicarboxylic acid and
  (c) at least one ethylenically unsaturated N-containing monomer with a permanent cationic charge, and
(C) at least one inorganic peroxide compound selected from sodium peroxodisulfate, sodium perborate and sodium percarbonate.

15 Claims, No Drawings

FORMULATIONS, USE THEREOF AS OR FOR THE PRODUCTION OF DISHWASHING DETERGENTS, AND PRODUCTION THEREOF

CROSS-REFERENCE TO RELATED APPLICATIONS

This application is a U.S. National Phase Application of PCT/EP2015/063130, filed Jun. 12, 2015, which is incorporated herein by reference in its entirety.

The present invention relates to formulations comprising
(A) at least one compound selected from aminocarboxylates,
(B) at least one graft copolymer composed of
  (a) at least one graft base selected from monosaccharides, disaccharides, oligosaccharides and polysaccharides, and side chains obtainable by grafting on of
  (b) at least one ethylenically unsaturated mono- or dicarboxylic acid and
  (c) at least one ethylenically unsaturated N-containing monomer with a permanent cationic charge, and
(C) at least one inorganic peroxide compound selected from sodium peroxodisulfate and sodium percarbonate.

Furthermore, the present invention relates to a process for the preparation of formulations according to the invention and to their use as or for producing dishwashing detergents, in particular dishwashing detergents for machine dishwashing.

Dishwashing detergents have to meet many requirements. For example, they have to clean the dishes thoroughly, they should have no harmful or potentially harmful substances in the wastewater, they should permit the running-off and drying of the water from the dishes, the detached soil constituents must be lastingly dispersed or emulsified so that they do not deposit themselves on the surface of the ware. The dishwashing detergents should not lead to problems during the operation of the dishwasher. Finally, they should not lead to esthetically undesired consequences on the item to be cleaned. In particular, no whitish marks or deposits should arise which are formed on account of the presence of lime or other inorganic and organic salts during the drying up of water drops or, as a result of deposition of soil constituents or inorganic salts, deposit themselves on the ware even during the washing process.

Particularly in modern machine dishwashing detergents, multifunctional detergents (e.g. 3-in-1 detergents or generally x-in-1 detergents), the functions of cleaning, of clear rinsing and of water softening are combined in a single detergent formulation, meaning that both the topping up of salt (in the case of water hardness from 0° to 21° German hardness) as well as the topping up of rinse aid becomes superfluous for the consumer.

In x-in-1 detergents, polymers are often used for the purposes of inhibiting deposition. These may be in phosphate-containing detergents for example sulfonate-containing polymers which exhibit in particular effects on the inhibition of calcium phosphate deposits. The surfactants used are selected such that they are carried into the clear-rinse process, where they ensure optimum wetting and a good clear-rinse result. Further suitable polymers are polycarboxylates such as, for example, polyacrylic acids.

The trend towards phosphate-free detergents, which are also furthermore intended to be used without rinse aid and ion exchanger, however, requires new solutions. In phosphate-free dishwashing detergents, the composition of the salts that are produced is different to that in phosphate-containing detergents, meaning that polymers used hitherto are in many cases not adequately effective. In particular, as far as deposit inhibition is concerned, phosphate-free dishwashing detergents are still in need of improvement.

EP 2 138 560 A1 discloses graft copolymers and their use in compositions for cleaning hard surfaces, including as dishwashing detergents. The detergents proposed in EP 2 138 560 A1, however, in many cases do not have adequate deposit inhibition, for example as dishwashing detergents on cutlery items such as knives and in particular on glass. It is also found that they do not adequately remove for example stubbornly coloring stains such as remains of tea.

It was therefore the object to provide formulations which have a very good deposit inhibition—in particular in phosphate-free compositions—especially on glass—and which are simultaneously also effective against stubborn stains. It was also the object to provide a process by means of which formulations can be prepared which have a very good deposit inhibition—in particular in phosphate-free compositions—and which are simultaneously also effective against stubborn stains.

Accordingly, the formulations defined at the start have been found, in the context of the present invention also called formulations according to the invention.

Formulations according to the invention can be liquid, solid, pasty or gel-like at room temperature, i.e. at 20° C. Preferably, formulations according to the invention are solid at room temperature. Formulations according to the invention that are solid at room temperature can be anhydrous or contain water, for example up to 20% by weight, preferably 0.1 to 10% by weight of water, determinable for example by Karl-Fischer titration or by determination of the dry residue at 80° C. under reduced pressure. Formulations according to the invention that are solid at room temperature can be present for example in the form of powder, granules or tablets.

Formulations according to the invention comprise
(A) at least one compound, for short also called compound (A), selected from methylglycine diacetate (MGDA) and glutamic acid diacetate (GLDA), and salts thereof. Preferably, compound (A) is selected from MGDA and its salts, in particular its sodium salts.

MGDA and GLDA can be present as racemate or as enantiomerically pure compound. GLDA is preferably selected from L-GLDA or enantiomerically enriched mixtures of L-GLDA in which at least 80 mol %, preferably at least 90 mol %, of L-GLDA is present.

In one embodiment of the present invention, compound (A) is selected from racemic MGDA. In another embodiment of the present invention, compound (A) is selected from L-MGDA or from enantiomer mixtures of L- and D-MGDA in which L-MGDA predominates and in which the L/D molar ratio is in the range from 55:45 to 95:5, preferably 60:40 to 85:15. The L/D molar ratio can be determined for example by polarimetry or by chromatographic means, preferably by HPLC with a chiral column, for example with cyclodextrin as stationary phase or with an optically active ammonium salt immobilized on the column. For example, it is possible to use an immobilized D-penicillamine salt.

MGDA or GLDA is preferably used as the salt. Preferred salts are ammonium salts and alkali metal salts, particularly preferably the potassium and in particular the sodium salts. These can for example have the general formula (I) or (II):

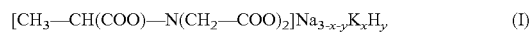

$$[CH_3—CH(COO)—N(CH_2—COO)_2]Na_{3-x-y}K_xH_y \qquad (I)$$

x in the range from 0.0 to 0.5, preferably up to 0.25,
y in the range from 0.0 to 0.5, preferably up to 0.25,

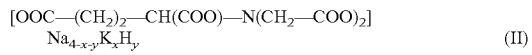
$$[OOC-(CH_2)_2-CH(COO)-N(CH_2-COO)_2] \\ Na_{4-x-y}K_xH_y \quad \text{(II)}$$

x in the range from 0.0 to 0.5, preferably up to 0.25,
y in the range from 0.0 to 0.5, preferably up to 0.25.

Very particular preference is given to the trisodium salt of MGDA and the tetrasodium salt of GLDA.

Compound (A) can comprise, in small amounts, cations which are different from alkali metal ions, for example $Mg^{2+}$, $Ca^{2+}$ or iron ions, for example $Fe^{2+}$ or $Fe^{3+}$. Ions of this kind are in many cases present in compound (A) as a consequence of the preparation. Cations different from alkali metal ions are present in one embodiment of the present invention in the range from 0.01 to 5 mol %, based on total MGDA or total GLDA.

In another embodiment of the present invention, no measurable fractions of cations which are different from alkali metal ions are present in compound (A).

In one embodiment of the present invention, compound (A) comprises small amounts of one or more impurities, which can be as a consequence of the preparation. In the case of MGDA, for example propionic acid, alanine or lactic acid may be present as impurity. Small amounts in this connection are fractions for example in the range from 0.01 to 1% by weight, based on compound (A). Impurities of this kind are disregarded in the context of the present invention unless expressly stated otherwise.

In one embodiment of the present invention, the formulation according to the invention comprises a compound (A), for example only trisodium salt of MGDA or only tetrasodium salt of GLDA. In this connection, compounds of the formulae (I) or (II) where x or y is not equal to zero should also in each case be referred to as one compound.

In another embodiment of the present invention, the formulation according to the invention comprises two compounds (A), for example a mixture of trisodium salt of MGDA and tetrasodium salt of GLDA, for example in a molar ratio in the range from 1:1 to 1:10.

Formulations according to the invention further comprise (B) at least one graft copolymer which in the context of the present invention is also called graft copolymer (B) and which is composed of (a) at least one graft base, for short called graft base (a), which is selected from monosaccharides, disaccharides, oligosaccharides and polysaccharides, and side chains obtainable by grafting on of (b) at least one ethylenically unsaturated mono- or dicarboxylic acid, for short called monocarboxylic acid (b) or dicarboxylic acid (b), and (c) at least one ethylenically unsaturated N-containing monomer with a permanent cationic charge, for short called monomer (c).

Monosaccharides suitable as graft base (a) selected may be for example aldopentoses, pentuloses (ketopentoses), aldohexoses and hexuloses (ketohexoses). Suitable aldopentoses are e.g. D-ribose, D-xylose and L-arabinose. Aldohexoses that may be mentioned are D-glucose, D-mannose and D-galactose; examples of hexuloses (ketohexoses) to be mentioned are in particular D-fructose and D-sorbose.

In the context of the present invention, deoxy sugars such as, for example, L-fucose and L-rhamnose, should also be included among monosaccharides.

Examples of disaccharides which may be mentioned are, for example, cellobiose, lactose, maltose and sucrose.

In the context of the present invention, oligosaccharides that may be mentioned are carbohydrates with three to ten monosaccharide units per molecule, for example glycans. In the context of the present invention, polysaccharides is the term used to refer to carbohydrates with more than ten monosaccharide units per molecule. Oligo- and polysaccharides may be for example linear, cyclic or branched.

Polysaccharides to be mentioned by way of example are biopolymers such as starch and glycogen, and cellulose, dextran and tunicin. Furthermore, mention is to be made of inulin as polycondensate of D-fructose (fructans), chitin and alginic acid. Further examples of polysaccharides are starch degradation products, for example products which can be obtained by enzymatic or so-called chemical degradation of starch. Examples of the so-called chemical degradation of starch are oxidative degradation and acid-catalyzed hydrolysis.

Preferred examples of starch degradation products are maltodextrins and glucose syrup. In the context of the present invention, maltodextrin is the term used to refer to mixtures of monomers, dimers, oligomers and polymers of glucose. The percentage composition differs depending on the degree of hydrolysis. This is described by the dextrose equivalent, which in the case of maltodextrin is between 3 and 40.

Preferably, graft base (a) is selected from polysaccharides, in particular from starch, which is preferably not chemically modified. In one embodiment of the present invention, starch is selected from those polysaccharides which have in the range from 20 to 30% by weight amylose and in the range from 70 to 80% amylopectin. Examples are corn starch, rice starch, potato starch and wheat starch.

Side chains are grafted on to the graft base (a). Per molecule of graft copolymer (B), preferably on average one to ten side chains can be grafted on. Preferably, in this connection, a side chain is linked with the anomeric carbon atom of a monosaccharide or with an anomeric carbon atom of the chain end of an oligo- or polysaccharide. The number of side chains is limited upwards by the number of carbon atoms with hydroxyl groups of the graft base (a) in question.

Examples of monocarboxylic acids (b) are ethylenically unsaturated $C_3$-$C_{10}$-monocarboxylic acids and the alkali metal or ammonium salts thereof, in particular the potassium and the sodium salts. Preferred monocarboxylic acids (b) are acrylic acid and methacrylic acid, and also sodium (meth) acrylate. Mixtures of ethylenically unsaturated $C_3$-$C_{10}$ monocarboxylic acids and in particular mixtures of acrylic acid and methacrylic acid are also preferred components (b).

Examples of dicarboxylic acids (b) are ethylenically unsaturated $C_4$-$C_{10}$-dicarboxylic acids and their mono- and in particular dialkali metal or ammonium salts, in particular the dipotassium and the disodium salts, and also anhydrides of ethylenically unsaturated $C_4$-$C_{10}$-dicarboxylic acids. Preferred dicarboxylic acids (b) are maleic acid, fumaric acid, itaconic acid, and also maleic anhydride and itaconic anhydride.

In one embodiment, graft copolymer (B) comprises in at least one side chain, besides monomer (c) at least one monocarboxylic acid (b) and at least one dicarboxylic acid (b). In a preferred embodiment of the present invention, graft copolymer (B) comprises in polymerized-in form in the side chains, besides monomer (c), exclusively monocarboxylic acid (b), but no dicarboxylic acid (b).

Examples of monomers (c) are ethylenically unsaturated N-containing compounds with a permanent cationic charge, i.e. those ethylenically unsaturated N-containing compounds which form ammonium salts with anions such as sulfate, $C_1$-$C_4$-alkyl sulfates and halides, in particular with chloride, and independently of the pH. Any desired mixtures of two or more monomers (c) are also suitable.

Examples of suitable monomers (c) are the correspondingly quaternized derivatives of vinyl- and allyl-substituted nitrogen heterocycles such as 2-vinylpyridine and 4-vinylpyridine, 2-allylpyridine and 4-allylpyridine, and also N-vinylimidazole, e.g. 1-vinyl-3-methylimidazolium chloride. Also of suitability are the correspondingly quaternized derivatives of N,N-diallylamines and N,N-diallyl-N-alkylamines, such as e.g. N,N-diallyl-N,N-dimethylammonium chloride (DADMAC).

In one embodiment of the present invention, monomer (c) is selected from correspondingly quaternized, ethylenically unsaturated amides of mono- and dicarboxylic acids with diamines which have at least one primary or secondary amino group. Preference is given here to those diamines which have one tertiary and one primary or secondary amino group.

In another embodiment of the present invention, monomer (c) is selected from correspondingly quaternized, ethylenically unsaturated esters of mono- and dicarboxylic acids with $C_2$-$C_{12}$-amino alcohols which are mono- or dialkylated on the amine nitrogen.

Of suitability as acid component of the aforementioned esters and amides are e.g. acrylic acid, methacrylic acid, fumaric acid, maleic acid, itaconic acid, crotonic acid, maleic anhydride, monobutyl maleate and mixtures thereof. As acid component, preference is given to using acrylic acid, methacrylic acid and mixtures thereof.

Preferred monomers (c) are trialkylaminoethyl (meth)acrylatochloride or alkyl sulfate and trialkylaminopropyl (meth)acrylatochloride or alkyl sulfate, and also (meth)acrylamido-ethyltrialkylammonium chloride or alkyl sulfate and (meth)acrylamidopropyltrialkylammonium chloride or alkyl sulfate, where the respective alkyl radical is preferably methyl or ethyl or mixtures thereof.

Very particular preference is given to (meth)acrylamidopropyltrimethylammonium halide, in particular acrylamidopropyltrimethylammonium chloride ("APTAC") or methacrylamido-propyltrimethylammonium chloride ("MAPTAC").

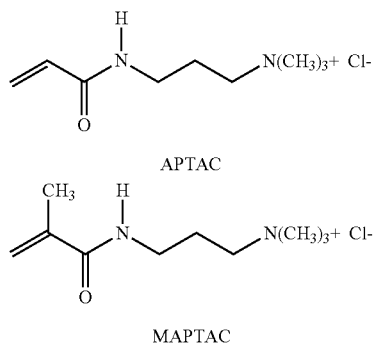

APTAC

MAPTAC

In another preferred embodiment of the present invention, monomer (c) is selected from trimethylammonium $C_2$-$C_3$-alkyl(meth)acrylatohalide, in particular 2-(trimethylamino)ethyl(meth)acrylatochloride and 3-(trimethylamino)propyl (meth)acrylatochloride.

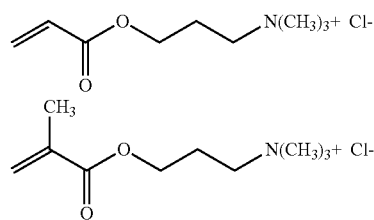

Graft copolymer (B) can comprise, in polymerized-in form, in one or more side chains at least one further comonomer (d), for example hydroxyalkyl esters such as 2-hydroxyethyl (meth)acrylate or 3-hydroxypropyl (meth)acrylate, or esters of alkoxylated fatty alcohols, or comonomers containing sulfonic acid groups, for example 2-acrylamido-2-methylpropanesulfonic acid (AMPS) and its alkali metal salts.

Preferably, graft copolymer (B) comprises no further comonomers (d) in one or more side chains apart from monomer (c) and monocarboxylic acid (b) or dicarboxylic acid (b).

In one embodiment of the present invention, the fraction of graft base (a) in graft copolymer (B) is in the range from 40 to 95% by weight, preferably from 50 to 90% by weight, in each case based on total graft copolymer (B).

In one embodiment of the present invention, the fraction of monocarboxylic acid (b) or dicarboxylic acid (b) is in the range from 2 to 40% by weight, preferably from 5 to 30% by weight and in particular from 5 to 25% by weight, in each case based on total graft copolymer (B).

Monomer (C) or monomers (C) is or are polymerized in in amounts of from 5 to 50% by weight, preferably from 5 to 40% by weight and particularly preferably from 5 to 30% by weight, in each case based on total graft copolymer (B).

It is preferred if graft copolymer (B) comprises, in polymerized-in form, more monocarboxylic acid (b) than monomer (c), and specifically based on the molar fractions, for example in the range from 1.1:1 to 5:1, preferably 2:1 to 4:1.

In one embodiment of the present invention, the average molecular weight ($M_w$) of graft copolymer (B) is in the range from 2000 to 200 000 g/mol, preferably from 5000 to 150 000 and in particular in the range from 8000 to 100 000 g/mol. The average molecular weight $M_w$ is measured preferably by gel permeation chromatography in aqueous KCl/formic acid solution.

Graft copolymer (B) can preferably be obtained as aqueous solution from which it can be isolated, e.g. by spray drying, spray granulation or freeze drying.

If desired, solution of graft copolymer (B) or dried graft copolymer (B) can be used for producing the formulations according to the invention.

Monomer (c) per se can be polymerized in graft copolymer (B) or a nonquaternized equivalent, in the case of APTAC for example

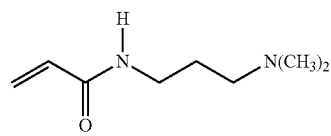

and in the case of MAPTAC with

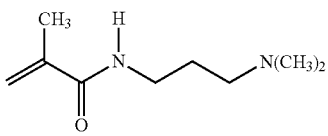

and the copolymerization can be followed by alkylation, for example with $C_1$-$C_8$-alkyl halide or di-$C_1$-$C_4$-alkyl sulfate, for example with ethyl chloride, ethyl bromide, methyl chloride, methyl bromide, dimethyl sulfate or diethyl sulfate.

It is preferred to stabilize graft copolymer (B) by at least one biocide. Examples of suitable biocides are isothiazolinones, for example 1,2-benzisothiazolin-3-one ("BIT"), octylisothiazolinone ("OIT"), dichlorooctylisothiazolinone ("DCOIT"), 2-methyl-2H-isothiazolin-3-one ("MIT") and 5-chloro-2-methyl-2H-isothiazolin-3-ones ("CIT"), phenoxyethanol, alkylparabens such as methylparaben, ethylparaben, propylparaben, benzoic acid and its salts such as e.g. sodium benzoate, benzyl alcohol, alkali metal sorbates such as e.g. sodium sorbate, and (substituted) hydantoins such as e.g. 1,3-bis(hydroxymethyl)-5,5-dimethylhydantoin (DMDM hydantoin). Further examples are 1,2-dibromo-2,4-dicyanobutane, iodo-2-propynyl butylcarbamate, iodine and iodophores.

Formulations according to the invention further comprise (C) at least one inorganic peroxide compound, which is also referred to for short in the context of the present invention as peroxide (C). Peroxide (C) is selected from sodium peroxodisulfate, sodium perborate and sodium percarbonate, preferably sodium percarbonate.

Peroxide (C) can be anhydrous or preferably water-containing. Examples of water-containing sodium perborates is $Na_2[B(OH)_2(O_2)]_2)$, sometimes also written as $NaBO_2.O_2.3H_2O$. Example of water-containing sodium percarbonate is is 2 $Na_2CO_3.3H_2O_2$. Particularly preferably, peroxide (C) is selected from water-containing percarbonates.

In one embodiment of the present invention, formulation according to the invention is free from phosphates and polyphosphates, with hydrogen phosphates being subsumed, for example free from trisodium phosphate, pentasodium tripolyphosphate and hexasodium metaphosphate. In connection with phosphates and polyphosphates in the context of the present invention, "free from" is to be understood as meaning that the content of phosphate and polyphosphate is in total in the range from 10 ppm to 0.2% by weight, determined by gravimetry.

In one embodiment of the present invention, formulation according to the invention is free from those heavy metal compounds which do not act as bleach catalysts, in particular compounds of iron. In connection with heavy metal compounds in the context of the present invention "free from" is understood as meaning that the content of heavy metal compounds which do not act as bleach catalysts is in total in the range from 0 to 100 ppm, preferably 1 to 30 ppm, determined by the Leach method.

In the context of the present invention, "heavy metals" are all metals with a specific density of at least 6 g/cm$^3$, with the exception of zinc and bismuth. In particular, heavy metals are precious metals and also iron, copper, lead, tin, nickel, cadmium and chromium.

In one embodiment of the present invention, formulation according to the invention comprises in total in the range from 1 to 50% by weight of compound (A), preferably 5 to 45% by weight, particularly preferably 10 to 35% by weight;
in total in the range from 0.1 to 4% by weight of graft copolymer (B), preferably 0.3 to 2% by weight, particularly preferably 0.5 to 1.5% by weight, and
in the range from 1 to 20% by weight of peroxide (C), preferably 2 to 15% by weight, particularly preferably 3 to 12% by weight,
based in each case on the solids content of the formulation in question.

Formulations according to the invention can comprise one or more further ingredients (D). Ingredients (D) are different from compound (A), graft copolymer (B) and peroxide (C).

For example, the formulation according to the invention can comprise one or more chlorine bleaches, in particular sodium hypochlorite. However, it is preferred if formulation according to the invention comprises no chlorine bleach.

Formulations according to the invention can have one or more further ingredients (D), for example one or more surfactants, one or more enzymes, one or more enzyme stabilizers, one or more builders, in particular phosphate-free builders, one or more cobuilders, one or more alkali carriers, one or more bleach catalysts, one or more bleach activators, one or more bleach stabilizers, one or more antifoams, one or more corrosion inhibitors, one or more builders, binders, buffers, dyes, one or more fragrances, one or more acids, one or more organic solvents, one or more tableting auxiliaries, one or more disintegration agents, also called tablet disintegrants, one or more thickeners, or one or more solubility promoters.

Examples of surfactants are in particular nonionic surfactants, and mixtures of anionic or zwitterionic surfactants with nonionic surfactants. Preferred nonionic surfactants are alkoxylated alcohols and alkoxylated fatty alcohols, di- and multiblock copolymers of ethylene oxide and propylene oxide and reaction products of sorbitan with ethylene oxide or propylene oxide, alkyl glycosides and so-called amine oxides.

Preferred examples of alkoxylated alcohols and alkoxylated fatty alcohols are compounds of the general formula (III)

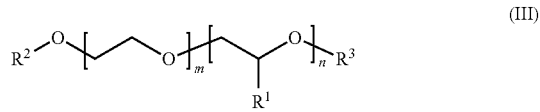

in which the variables are defined as follows:
$R^1$ are identical or different and selected from linear $C_1$-$C_{10}$-alkyl, preferably ethyl and particularly preferably methyl,
$R^2$ is selected from $C_8$-$C_{22}$-alkyl, for example n-$C_8H_{17}$, n-$C_{10}H_{21}$, n-$C_{12}H_{25}$, n-$C_{14}H_{29}$, n-$C_{16}H_{33}$ or n-$C_{18}H_{37}$,
$R^3$ is selected from hydrogen and $C_1$-$C_{10}$-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl or isodecyl,
m and n are in the range from zero to 300, where the sum of n and m is at least one. Preferably, m is in the range from 1 to 100 and n is in the range from 0 to 30.

Here, compounds of the general formula (III) can be block copolymers or random copolymers, preferably block copolymers.

Other preferred examples of alkoxylated alcohols and alkoxylated fatty alcohols are compounds of the general formula (IV)

$$R^4-O-\left[\begin{array}{c}R^5\\|\\-O-\end{array}\right]_a\left[-O-\right]_b\left[-O-\begin{array}{c}R^5\\|\\\end{array}\right]_d H \quad (IV)$$

in which the variables are defined as follows:
$R^4$ is selected from $C_6$-$C_{20}$-alkyl, in particular n-$C_8H_{17}$, n-$C_{10}H_{21}$, n-$C_{12}H_{25}$, n-$C_{14}H_{29}$, n-$C_{16}H_{33}$, n-$C_{18}H_{37}$,
$R^5$ are identical or different and selected from linear $C_1$-$C_4$-alkyl, preferably in each case identical and ethyl and particularly preferably methyl,
a is a number in the range from 1 to 6,
b is a number in the range from 4 to 20,
d is a number in the range from 4 to 25.

In this connection, compounds of the general formula (IV) can be block copolymers or random copolymers, preferably block copolymers.

Other preferred examples of alkoxylated alcohols and alkoxylated fatty alcohols are hydroxy mixed ethers of the general formula (V)

$$R^6-CH(OH)-CH_2-O-(AO)_k-R^7 \quad (V)$$

where the variables are selected as follows:
$R^6$ $C_4$-$C_{30}$-alkyl, branched or unbranched, or $C_4$-$C_{30}$-alkenyl, branched or unbranched, with at least one C—C double bond.
Preferably, $R^6$ is selected from $C_4$-$C_{30}$-alkyl, branched or unbranched, particularly preferably unbranched $C_4$-$C_{30}$-alkyl and very particularly preferably n-$C_{10}$-$C_{12}$-alkyl.
$R^7$ $C_1$-$C_{30}$-alkyl, branched or unbranched, or $C_2$-$C_{30}$-alkenyl, branched or unbranched, with at least one C—C double bond.
Preferably, $R^7$ is selected from $C_4$-$C_{30}$-alkyl, branched or unbranched, particularly preferably unbranched $C_6$-$C_{20}$-alkyl and very particularly preferably n-$C_8$-$C_{11}$-alkyl.
k is a number in the range from 1 to 100, preferably from 5 to 60, particularly preferably 10 to 50 and very particularly preferably 20 to 40,
AO is selected from alkylene oxide, different or identical and selected from $CH_2$—$CH_2$—O, $(CH_2)_3$—O, $(CH_2)_4$—O, $CH_2CH(CH_3)$—O, $CH(CH_3)$—$CH_2$—O— and $CH_2CH(n$-$C_3H_7)$—O. A preferred example of AO is $CH_2$—$CH_2$—O (EO).

In one embodiment of the present invention, $(AO)_k$ is selected from $(CH_2CH_2O)_{k1}$, where k1 is selected from numbers in the range from 1 to 50.

In one embodiment of the present invention, $(AO)_k$ is selected from —$(CH_2CH_2O)_{k2}$—$(CH_2CH(CH_3)$—$O)_{k3}$ and —$(CH_2CH_2O)_{k2}$—$(CH(CH_3)CH_2$—$O)_{x3}$, where k2 and k3 can be identical or different and are selected from numbers in the range from 1 to 30.

In one embodiment of the present invention, $(AO)_k$ is selected from —$(CH_2CH_2O)_{k4}$, where k4 is in the range from 10 to 50, AO is EO, and $R^6$ and $R^7$, independently of one another, are selected from $C_8$-$C_{14}$-alkyl.

In connection with the present invention, k or k1, k2, k3 and k4 are in each case understood as meaning average values, with the numerical average being preferred. Consequently, each of the variables k or k1, k2, k3 or k4 can—if present—signify a fraction. A specific molecule can naturally only ever carry a whole number of AO units.

Further examples of suitable nonionic surfactants are compounds of the general formula (VI) and in particular of the formula (VI a)

$$R^4-\overset{O}{\underset{\|}{C}}-O-(AO)_w-R^8 \quad (VI)$$

$$R^4-\overset{O}{\underset{\|}{C}}-O-(AO)_{w1}-(EO)_{w2}-(A^3O)_{w3}-R^8 \quad (VIa)$$

where
$R^4$ and AO are as defined above and EO is ethylene oxide, i.e. $CH_2CH_2O$, where the AO in formula (VI) and (VI a) can in each case be identical or different,
$R^8$ is selected from $C_8$-$C_{18}$-alkyl, linear or branched
$A^3O$ is selected from propylene oxide and butylene oxide,
w is a number in the range from 15 to 70, preferably 30 to 50,
w1 and w3 are numbers in the range from 1 to 5 and
w2 is a number in the range from 13 to 35.

Further suitable nonionic surfactants are selected from di- and multiblock copolymers composed of ethylene oxide and propylene oxide. Further suitable nonionic surfactants are selected from ethoxylated or propoxylated sorbitan esters. Likewise of suitability are amine oxides or alkylglycosides. An overview of suitable further nonionic surfactants can be found in EP-A 0 851 023 and in DE-A 198 19 187.

Mixtures of two or more different nonionic surfactants may also be present.

Examples of anionic surfactants are $C_8$-$C_{20}$-alkyl sulfates, $C_8$-$C_{20}$-alkylsulfonates and $C_8$-$C_{20}$-alkyl ether sulfates with one to 6 ethylene oxide units per molecule.

In one embodiment of the present invention, the formulation according to the invention can comprise in the range from 3 to 20% by weight of surfactant.

Formulations according to the invention can comprise one or more enzymes. Examples of enzymes are lipases, hydrolases, amylases, proteases, cellulases, esterases, pectinases, lactases and peroxidases.

Formulations according to the invention can comprise for example up to 5% by weight of enzyme, preferably 0.1 to 3% by weight, in each case based on total solids content of the formulation according to the invention.

Formulations according to the invention can comprise one or more enzyme stabilizers. Enzyme stabilizers serve to protect enzyme—particularly during storage—against damage such as, for example, inactivation, denaturation or decomposition for example as a result of physical influences, oxidation or proteolytic cleavage.

Examples of enzyme stabilizers are reversible protease inhibitors, for example benzamidine hydrochloride, borax, boric acid, boronic acids or salts or esters thereof, including in particular derivatives with aromatic groups, for example ortho-, meta- or para-substituted phenyl boronic acids, in particular 4-formylphenyl boronic acid, or the salts or esters of the aforementioned compounds. Peptide aldehydes, i.e. oligopeptides with a reduced carbon terminus, in particular those made of 2 to 50 monomers, are also used for this purpose. Peptidic reversible protease inhibitors include inter alia ovomucoid and leupeptin. Specific, reversible peptide inhibitors for the protease subtilisin, as well as fusion proteins of proteases and specific peptide inhibitors are also suitable for this purpose.

Further examples of enzyme stabilizers are amino alcohols such as mono-, di-, triethanol- and -propanolamine and mixtures thereof, aliphatic mono- and dicarboxylic acids up to $C_{12}$-carboxylic acids, such as for example succinic acid. Terminally capped fatty acid amide alkoxylates are also suitable for this purpose. Other examples of enzyme stabilizers are sodium sulfite, reducing sugars and potassium sulfate. A further example of a suitable enzyme stabilizer is sorbitol.

Formulations according to the invention can comprise one or more builders (D), in particular phosphate-free builders (D). In the context of the present invention, compound (A) does not count as builder (D). Examples of suitable builders (D) are silicates, in particular sodium disilicate and sodium metasilicate, zeolites, sheet silicates, in particular those of the formula $\alpha\text{-Na}_2\text{Si}_2\text{O}_5$, $\beta\text{-Na}_2\text{Si}_2\text{O}_5$, and $\delta\text{-Na}_2\text{Si}_2\text{O}_5$, furthermore citric acid and its sodium salts, succinic acid and its alkali metal salts, fatty acid sulfonates, $\alpha$-hydroxypropionic acid, alkali metal malonates, fatty acid sulfonates, alkyl and alkenyl disuccinates, nitrilotriacetic acid, ethylenediaminetetraacetic acid, diethylenetriaminepentaacetic acid, hydroxyethylethylenediaminetriacetic acid, iminodisuccinic acid, hydroxyiminodisuccinic acid, ethylenediaminedisuccinic acid, aspartic acid diacetic acid, and salts thereof, furthermore carboxymethylinulin, tartaric acid diacetate, tartaric acid monoacetate, oxidized starch, and polymeric builders (D), for example polycarboxylates and polyaspartic acid.

Very particularly preferably, formulations according to the invention comprise a salt of citric acid, in particular sodium citrate. Sodium citrate can be used as feed material for the formulations according to the invention in hydrate form or anhydrous form. In connection with the present invention, sodium citrate (D) is preferably understood as meaning the dihydrate of the trisodium salt of citric acid.

Preferably, compound (A) is used in a weight ratio to sodium citrate (D) in the range from 10:1 to 1:10, particularly preferably the ratio is 3:1 to 1:8.

Formulations according to the invention can comprise for example in the range from in total 5 to 40% by weight, preferably up to 35% by weight, of further builders, in particular sodium citrate, based on the total solids content of the formulation according to the invention in question.

Very particularly preferably, formulations according to the invention comprise one or more polymeric builders (D). Polymeric builders (D) are understood here as meaning organic polymers, in particular polycarboxylates and polyaspartic acid. Polymeric builders have no or only a negligible effect as surfactant.

In one embodiment of the present invention, polymeric builder (D) is selected from polycarboxylates, for example alkali metal salts of (meth)acrylic acid homopolymers or (meth)acrylic acid copolymers.

Suitable comonomers are monoethylenically unsaturated dicarboxylic acids such as maleic acid, fumaric acid, maleic anhydride, itaconic acid and citraconic acid. A suitable polymer is in particular polyacrylic acid, which preferably has an average molecular weight $M_w$ in the range from 2000 to 40 000 g/mol, preferably 2000 to 10 000 g/mol, in particular 3000 to 8000 g/mol. Also of suitability are copolymeric polycarboxylates, in particular those of acrylic acid with methacrylic acid and of acrylic acid or methacrylic acid with maleic acid and/or fumaric acid.

In one embodiment of the present invention, polymeric builder (D) is selected from one or more copolymers prepared from at least one monomer from the group consisting of monoethylenically unsaturated $C_3$-$C_{10}$-mono- or dicarboxylic acids or anhydrides thereof, such as maleic acid, maleic anhydride, acrylic acid, methacrylic acid, fumaric acid, itaconic acid and citraconic acid and at least one hydrophilic or hydrophobic comonomer as listed below.

Suitable hydrophobic monomers are, for example, isobutene, diisobutene, butene, pentene, hexene and styrene, olefins with 10 or more carbon atoms or mixtures thereof such as, for example, 1-decene, 1-dodecene, 1-tetradecene, 1-hexadecene, 1-octadecene, 1-eicosene, 1-docosene, 1-tetracosene and 1-hexacosene, $C_{22}$-$\alpha$-olefin, a mixture of $C_{20}$-$C_{24}$-$\alpha$-olefins and polyisobutene with on average 12 to 100 carbon atoms.

Suitable hydrophilic monomers are monomers with sulfonate or phosphonate groups and also nonionic monomers with hydroxyfunction or alkylene oxide groups. Examples which may be mentioned: allyl alcohol, isoprenol, methoxypolyethylene glycol (meth)acrylate, methoxypolypropylene glycol (meth)acrylate, methoxypolybutylene glycol (meth) acrylate, methoxypoly(propylene oxide-co-ethylene oxide) (meth)acrylate, ethoxypolyethylene glycol (meth)acrylate, ethoxypolypropylene glycol (meth)acrylate, ethoxypolybutylene glycol (meth)acrylate and ethoxypoly(propylene oxide-co-ethylene oxide) (meth)acrylate. The polyalkylene glycols here comprise 3 to 50, in particular 5 to 40 and especially 10 to 30 alkylene oxide units.

Particularly preferred monomers that contain sulfonic acid groups here are 1-acrylamido-1-propanesulfonic acid, 2-acrylamido-2-propanesulfonic acid, 2-acrylamido-2-methylpropanesulfonic acid, 2-methacrylamido-2-methylpropanesulfonic acid, 3-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropyl methacrylate, sulfomethacrylamide, sulfomethylmethacrylamide, and salts of the aforementioned acids, e.g. the sodium, potassium or ammonium salts thereof.

Particularly preferred phosphonate-group-containing monomers are vinylphosphonic acid and its salts.

Moreover, one or more amphoteric polymers different from graft polymer (B) can be used as polymeric builders (D). Examples of amphoteric polymers are copolymers of at least one ethylenically unsaturated carboxylic acid selected from acrylic acid and methacrylic acid, at least one amide, selected from N—$C_1$-$C_{10}$-alkyl(meth)acrylamide, acrylamide and methacrylamide, and at least one comonomer selected from DADMAC, MAPTAC and APTAC.

Formulations according to the invention can comprise for example in the range from in total 10 to 75% by weight, preferably up to 50% by weight of builder (D), based on the solids content of the formulation according to the invention in question.

Formulations according to the invention can comprise for example in the range from in total 2 to 15% by weight, preferably up to 10% by weight, of polymeric builder (D), based on the solids content of the formulation according to the invention in question.

In a particularly preferred embodiment, formulation according to the invention comprises, besides graft polymer (B), a polymeric builder (D). The weight ratio of polymeric builders (D) to graft copolymer (B) is then preferably 30:1 to 3:1.

In one embodiment of the present invention, formulations according to the invention can comprise one or more cobuilders.

Examples of cobuilders are phosphonates, for example hydroxyalkanephosphonates and aminoalkanephosphonates. Among the hydroxyalkanephosphonates, 1-hydroxyethane-1,1-diphosphonate (HEDP) is of particular importance as cobuilder. It is preferably used as sodium salt, with the disodium salt giving a neutral reaction and the tetrasodium salt an alkaline reaction (pH 9). Suitable aminoalkanephosphonates are preferably ethylenediaminetetramethylenephosphonate (EDTMP), diethylenetriaminepentamethylenephosphonate (DTPMP), and higher homologs thereof. They are preferably used in the form of the neutrally reacting sodium salts, e.g. as hexasodium salt of EDTMP or as hepta- and octasodium salt of DTPMP.

Formulations according to the invention can comprise one or more alkali carriers. Alkali carriers provide for example for the pH of at least 9 if an alkaline pH is desired. Of suitability are, for example, alkali metal carbonates, alkali metal hydrogencarbonates, alkali metal hydroxides and alkali metal metasilicates. A preferred alkali metal in each case is potassium, particularly preferred is sodium. Particularly preferably, formulations according to the invention comprise sodium carbonate.

Formulations according to the invention can comprise one or more bleach catalysts. Bleach catalysts can be selected from bleach-boosting transition metal salts or transition metal complexes such as, for example, manganese-, iron-, cobalt-, ruthenium- or molybdenum-salen complexes or manganese-, iron-, cobalt-, ruthenium- or molybdenum-carbonyl complexes. Manganese, iron, cobalt, ruthenium, molybdenum, titanium, vanadium and copper complexes with nitrogen-containing tripod ligands, and cobalt-, iron-, copper- and ruthenium-amine complexes can also be used as bleach catalysts.

Formulations according to the invention can comprise one or more bleach activators, for example N-methylmorpholinium-acetonitrile salts ("MMA salts"), trimethylammonium acetonitrile salts, N-acylimide such as, for example, N-nonanoylsuccinimide, 1,5-diacetyl-2,2-dioxohexahydro-1,3,5-triazine ("DADHT") or nitrile quats (trimethylammoniumacetonitrile salts).

Further examples of suitable bleach activators are tetraacetylethylenediamine (TAED) and tetraacetylhexylenediamine.

Formulations according to the invention can comprise one or more corrosion inhibitors. In the present case, these are to be understood as meaning those compounds which inhibit the corrosion of metal or glass. Examples of suitable corrosion inhibitors are triazoles, in particular benzotriazoles, bisbenzotriazoles, aminotriazoles, alkylaminotriazoles, also phenol derivatives, for example, hydroquinone, pyrocatechin, hydroxyhydroquinone, gallic acid, phloroglucinol or pyrogallol, also polyethyleneimine and salts of zinc or bismuth.

In one embodiment of the present invention, formulations according to the invention comprise in total in the range from 0.1 to 1.5% by weight of corrosion inhibitor, based on the solids content of the formulation according to the invention in question.

Formulations according to the invention can comprise one or more builders, for example sodium sulfate.

Formulations according to the invention can comprise one or more antifoams, selected for example from silicone oils and paraffin oils.

In one embodiment of the present invention, formulations according to the invention comprise in total in the range from 0.05 to 0.5% by weight of antifoam, based on the solids content of the formulation according to the invention in question.

In one embodiment of the present invention, formulations according to the invention can comprise one or more acids, for example methanesulfonic acid.

In one embodiment of the present invention, formulations according to the invention comprise one or more organic solvents.

In one embodiment of the present invention, formulations according to the invention can comprise one or more organic solvents. For example, organic solvents can be selected from the groups of the mono alcohols, diols, triols or polyols, the ethers, esters and/or amides. Particular preference is given in this connection to organic solvents which are water-soluble, with "water-soluble" solvents in the context of the present application being solvents which, at room temperature, are miscible with water completely, i.e. without miscibility gaps.

Organic solvents which are suitable for formulations according to the invention are selected preferably from the group of mono- or polyhydric alcohols, alkanolamines or glycol ethers which are miscible with water in the stated concentration range. Preferably, organic solvents are selected from ethanol, n- or isopropanol, butanols, glycol, 1,2-propanediol, or butanediol, glycerol, diglycol, propyl- or n-butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl, ethyl or propyl ether, dipropylene glycol methyl or ethyl ether, methoxy-, ethoxy- or butoxytriglycol, 1-butoxyethoxy-2-propanol, 3-methyl-3-methoxybutanol, propylene glycol t-butyl ether, and mixtures of two or more of the aforementioned organic solvents.

In one embodiment, formulations according to the invention comprise one or more disintegration agents, also called tablet disintegrants. Examples are starch, polysaccharides, for example dextrans, also crosslinked polyvinylpyrrolidone and polyethylene glycol sorbitan fatty acid esters.

In one embodiment of the present invention, formulations according to the invention have a pH in the range from 5 to 14, preferably 8 to 13. Here, in the case of those formulations according to the invention which are solid at room temperature, the pH of a 1% by weight aqueous solution or of the liquid phase of a 1% by weight aqueous suspension is determined.

Formulations according to the invention are very readily suitable as or for producing dishwashing detergents, in particular for machine dishwashing (automatic dishwashing or for short ADW). Formulations according to the invention themselves and dishwashing detergents produced from formulations according to the invention—in particular phosphate-free dishwashing detergents produced from formulations according to the invention—have a very good deposit inhibition particularly on ware made of glass during dishwashing.

In particular, formulations according to the invention are also effective on stubborn stains, for example on tea stains and tea residues, particularly preferably on tea stains and tea residues on porcelain.

Examples of ware made of metal are cutlery, pots, pans and garlic presses, in particular cutlery items such as knives, cake slices and serving cutlery.

Examples of ware made of glass that may be mentioned here are: glasses, glass bowls, glass crockery such as, for example, glass plates, but also objects which have at least one surface made of glass, which may be decorated or undecorated, for example glass vases, transparent pot lids and glass vessels for cooking.

Examples of ware made of plastics that may be mentioned here are plates, cups, beakers and bowls made of melamine, polystyrene and polyethylene.

Examples of ware made of porcelain that may be mentioned here are plates, cups, beakers and bowls made of porcelain, white or colored, in each case with or without decoration.

The present invention therefore further provides the use of formulations according to the invention for the washing of dishes and kitchen utensils, and specifically in particular for machine dishwashing, i.e. for washing using a dishwasher. The present invention further provides a method for machine dishwashing using at least one formulation according to the invention, in the context of the present invention also called dishwashing method according to the invention. To carry out the dishwashing method according to the invention, the procedure may involve bringing dishes or kitchen utensils into contact with an aqueous solution or suspension comprising at least one formulation according to the invention. After bringing them into contact, they can be left to act. Then, the liquor thus obtainable is removed, rinsing is carried out one or more times with preferably clear water and the dishes are left to dry.

In one embodiment of the present invention, the water used for the cleaning has a hardness in the range from 1 to 30° German hardness, preferably 2 to 25° German hardness, with German hardness being understood as meaning in particular the sum of magnesium hardness and calcium hardness.

In a particular variant of the dishwashing method according to the invention, neither regenerating salt nor separate rinse aid is used.

The present invention further provides a process for the preparation of formulations according to the invention, in the context of the present invention also called preparation process according to the invention. The preparation process according to the invention is characterized in that at least one compound (A), at least one graft copolymer (B) and at least one peroxide (C) and optionally one or more further ingredients (D) are mixed together in one or more steps and then optionally water is completely or partially removed.

Compound (A), graft copolymer (B), peroxide (C) and further ingredients (D) are described above.

In another embodiment of the present invention, compound (A), peroxide (C) and one or more further ingredients (D) are mixed in dry form and then an aqueous solution of graft copolymer (B) is added, either outside of or inside of a dishwasher.

In one embodiment of the present invention, before the water is at least partially removed, mixing with one or more further ingredients (D) for formulation according to the invention can be effected, for example with one or more surfactants, one or more enzymes, one or more enzyme stabilizers, one or more builders (D), preferably one or more phosphate-free builders (D), in particular one or more polymeric builders (D), one or more cobuilders (D), one or more alkali carriers, one or more acids, one or more bleach catalysts, one or more bleach activators, one or more bleach stabilizers, one or more antifoams, one or more corrosion inhibitors, one or more builders, with buffer or dye.

In one embodiment, the procedure involves removing the water from formulation according to the invention completely or partially, for example to a residual moisture in the range from zero to 15% by weight, preferably 0.1 to 10% by weight, by evaporating it, in particular by spray drying, spray granulation or compaction.

In one embodiment of the present invention, the water is removed, completely or partially, at a pressure in the range from 0.3 to 2 bar.

In one embodiment of the present invention, the water is removed, completely or partially, at temperatures in the range from 60 to 220° C.

Formulations according to the invention can be obtained easily by means of the preparation process according to the invention.

The formulations according to the invention can be provided in single- or multiphase form, as tablets or in the form of other dosage units, packaged or unpackaged.

The invention is further illustrated by means of working examples.

EXAMPLES

General remarks concerning the experiments relating to deposit inhibition

All of the washing experiments were carried out in a dishwasher from Miele, model G1222 SCL. Here, the program at 65° C. for the wash cycle and 65° C. for the clear-rinse cycle was chosen. The tests were carried out with hardened water with a water hardness of 21° German hardness (Ca/Mg):$HCO_3$ (3:1):1.35. No separate rinse aid was added and the incorporated water softener (ion exchanger) was not regenerated with regenerating salt. 18 g of the stated formulation according to the invention were dosed in each wash cycle. At the start of each wash cycle, 50 g of a ballast soiling were added, consisting of grease, protein and starch.

To assess the deposit inhibition, a total of 30 successive washing experiments were carried out with the same test ware. The test ware used in each washing experiment was stainless steel knives, blue melamine plates, drinking glasses and porcelain plates. One hour was left between every two washing experiments, for 10 min of which the door of the dishwasher was closed and for 50 min of which the door was open.

In each case 18 g of the stated formulation according to the invention were dosed per washing experiment. At the start of each washing experiment, moreover, 50 g of a ballast soiling were added, consisting of grease, protein and starch.

When the 30th washing experiment was completed, the test ware was inspected visually in a darkened chamber under light behind an aperture plate, and assessed on a grading scale from 1 (=considerable residues) to 10 (=no residues) as regards spots, streaks and film-like deposits.

General remarks concerning the experiments relating to detergency:

The procedure was essentially as described above except that the program at 50° C. was chosen for the wash cycle and 65° C. for the clear-rinse cycle.

In each case, 2 melamine plates DM-21 (egg yolk), DM-93 (triple soiled minced meat), DM-23 (egg yolk 1.5× soiled) (source: Center For Test Materials BV 3130 AC Vlaardingen, NL) and 2 tea cups (soiled according to the method in SOFW Journal, 132, 8-2006, pages 35-49) were placed into the dishwashers. No separate rinse aid was added and the inbuilt water softener (ion exchanger) was not regenerated with regenerating salt. In each case, 18 g of the stated formulation according to the invention and 50 g of IKW ballast soiling (SÖF W Journal, 132, 8-2006, 35-49) were metered into the dishwasher at the start of the washing experiment and a washing experiment was carried out.

After drying, the averages from eight reflectance measurements (Elrepho, 460 nm) were formed for each melamine plate. These averages were deducted from the starting reflectance values determined before the start from the melamine plates. Differential values are given in the table. The experiments were carried out as a double determination in two different dishwashers of the type stated above.

The tea cups were assessed visually (grading scale 1 to 10, 1=heavily soiled, 10=clean).

I. Preparation of Graft Copolymers (B), of Formulations According to the Invention and of Comparison Formulations Comonomers used:

(a.1): maltodextrin, commercially available as Cargill C*Dry MD01910

(a.2): spray-dried glucose syrup, commercially available as Cargill C*Dry GL01924

(a.3): maltodextrin, commercially available as Cargill C*Dry MD01955

(b.1): acrylic acid (c.1): 3-trimethylammonium propylmethacrylamide chloride ("MAPTAC")

(c.2): 3-trimethylammonium propylacrylamide chloride ("APTAC")

In the context of the present application, data are in % by weight unless expressly stated otherwise.

The biocide used is always a 9% by weight solution of 1,2-benzisothiazolin-3-one in water/propylene glycol mixture, commercially available as Proxel™ XL2 Antimicrobial. Quantitative data are tell qu'elle.

I.1 Preparation of a Graft Copolymer (B.1)

The graft copolymer B.1 was prepared analogously to Ex. 4 from EP 2 138 560 B1.

I.2 Preparation of a Graft Copolymer (B.2)

In a stirred reactor, 220 g of maltodextrin (a.1) in 618 g of water were introduced and heated to 80° C. with stirring. At 80° C., the following solutions were metered in simultaneously and via separate feeds as follows:

a) an aqueous solution of 41.6 g of (c.1) in 181 g of water, over the course of 4 hours.
b) a solution of 9.85 g of sodium peroxodisulfate in 68.0 g of water over the course of 5 h, simultaneously starting with the metered addition of (c.1).
c) a solution of 31.7 g of acrylic acid (b.1) and 35.2 g of sodium hydroxide solution (50% strength in water), diluted with 139 g of water, over the course of 2 hours, starting 2 hours after the start of the metered addition of (c.1).

After the addition of all three solutions was complete, the reaction mixture was stirred for one hour at 80° C. Then, a solution of 0.73 g of sodium peroxodisulfate in 10.0 g of water was added and the mixture was stirred for a further 2 hours at 80° C. The mixture was then cooled to room temperature and 8 g of biocide were added. This gave a 20.8% by weight solution of graft copolymer (B.2).

I.3 Preparation of a Graft Copolymer (B.3)

In a stirred reactor, 220 g of spray-dried glucose syrup (a.2) in 618 g of water were introduced and heated to 80° C. with stirring. At 80° C., the following solutions were metered in simultaneously and via separate feeds as follows:

a) an aqueous solution of 41.6 g of (c.1), in 181 g of water, over the course of 4 hours.
b) a solution of 9.85 g of sodium peroxodisulfate in 68.0 g of water over the course of 5 h, simultaneously starting with the metered addition of (c.1).
c) a solution of 31.7 g of acrylic acid (b.1) and 35.2 g of sodium hydroxide solution (50% strength in water), diluted with 139 g of water, over the course of 2 h, starting 2 h after the start of the metered addition of (c.1).

After the addition of all three solutions was completed, the reaction mixture was stirred for one hour at 80° C. Then, a solution of 0.73 g of sodium peroxodisulfate in 10.0 g of water was added and the mixture was stirred for a further 2 hours at 80° C. The mixture was then cooled to room temperature and 8 g of biocide were added. This gave a 19.8% by weight solution of graft copolymer (B.3).

I.4 Preparation of a Graft Copolymer (B.4)

In a stirred reactor, 264 g of maltodextrin (a.3) in 618 g of water were introduced and heated to 80° C. with stirring. At 80° C., the following solutions were metered in simultaneously and via separate feeds as follows:

a) an aqueous solution of 16.7 g of (c.1), further diluted with 156 g of water, over the course of 4 h.
b) a solution of 3.94 g of sodium peroxodisulfate in 68.0 g of water over the course of 5 h, simultaneously starting with the metered addition of (c.1).
c) a solution of 12.7 g of acrylic acid (b.1) and 14.1 g of sodium hydroxide solution (50% strength in water), diluted with 139 g of water, over the course of 2 hours, starting 2 hours after the start of the metered addition of (c.1).

After the addition of all three solutions was completed, the reaction mixture was stirred for one hour at 80° C. Then, a solution of 0.3 g of sodium peroxodisulfate in 10.0 g of water was added and the mixture was stirred for a further 2 hours at 80° C. The mixture was then cooled to room temperature and 8 g of biocide were added. This gave a 21.7% by weight solution of graft copolymer (B.4).

I.5 Preparation of a Graft Copolymer (B.5)

In a stirred reactor, 221 g of maltodextrin (a.3) in 618 g of water were introduced and heated to 80° C. with stirring. At 80° C., the following solutions were metered in simultaneously and via separate feeds as follows:

a) an aqueous solution of 55.0 g of (c.1) in 194 g of water, over the course of 4 hours.
b) a solution of 9.8 g of sodium peroxodisulfate in 68.0 g of water over the course of 5 h, simultaneously starting with the metered addition of (c.1).
c) a solution of 18 g of acrylic acid (b.1) and 20 g of sodium hydroxide solution (50% strength in water), diluted with 139 g of water, over the course of 2 hours, starting 2 hours after the start of the metered addition of (c.1).

After the addition of all three solutions was completed, the reaction mixture was stirred for one hour at 80° C. Then, a solution of 0.73 g of sodium peroxodisulfate in 10.0 g of water was added and the mixture was stirred for a further 2 hours at 80° C. The mixture was then cooled to room temperature and 8 g of biocide were added. This gave a 21.7% by weight solution of graft copolymer (B.5).

I.6 Preparation of a Graft Copolymer (B.6)

The experiment according to I.5 was repeated but metering in, as solution a), an aqueous solution of 59.8 g of (c.1) in 199 g of water and, as solution c), a solution of 13.2 g of acrylic acid (b.1) and 14.7 g of 50% by weight sodium hydroxide solution, diluted with 139.2 g of water.

This gave a 21.8% by weight solution of graft copolymer (B.6).

I.7 Preparation of a Graft Copolymer (B.7)

In a stirred reactor, 230 g of maltodextrin (a.3) in 618 g of water were introduced and heated to 80° C. with stirring. At 80° C., the following solutions were metered in simultaneously and via separate feeds as follows:
- a) an aqueous solution of 28.9 g of (c.1) in 168 g of water, over the course of 4 hours.
- b) a solution of 9.85 g of sodium peroxodisulfate in 68.0 g of water over the course of 5 h, simultaneously starting with the metered addition of (c.1).
- c) a solution of 44.5 g of acrylic acid (b.1) and 49.4 g of sodium hydroxide solution (50% strength in water), diluted with 139 g of water, over the course of 2 hours, starting 2 hours after the start of the metered addition of (c.1).

After the addition of all three solutions was completed, the reaction mixture was stirred for one hour at 80° C. Then, a solution of 0.73 g of sodium peroxodisulfate in 10.0 g of water was added and the mixture was stirred for a further 2 hours at 80° C. Then, the mixture was cooled to room temperature and 8 g of biocide were added. This gave a 22.4% by weight solution of graft copolymer (B.7).

I.8 Preparation of a Graft Copolymer (B.8)

In a stirred reactor, 147 g of maltodextrin (a.3) in 618 g of water were introduced and heated to 80° C. with stirring. At 80° C., the following solutions were metered in simultaneously and via separate feeds as follows:
- a) an aqueous solution of 83.3 g of (c.1) in 222 g of water, over the course of 4 hours.
- b) a solution of 19.7 g of sodium peroxodisulfate in 68.0 g of water over the course of 5 h, simultaneously starting with the metered addition of (c.1).
- c) a solution of 63.5 g of acrylic acid (b.1) and 70.5 g of sodium hydroxide solution (50% strength in water), diluted with 139 g of water, over the course of 2 hours, starting 2 hours after the start of the metered addition of (c.1).

After the addition of all three solutions was completed, the reaction mixture was stirred for one hour at 80° C. Then, a solution of 1.47 g of sodium peroxodisulfate in 10.0 g of water was added and the mixture was stirred for a further 2 hours at 80° C. The mixture was then cooled to room temperature and 8 g of biocide were added. This gave a 21.9% by weight solution of graft copolymer (B.8).

I.9 Preparation of a Graft Copolymer (B.9)

In a stirred reactor, 230 g of maltodextrin (a.3) in 618 g of water were introduced and heated to 80° C. with stirring. At 80° C., the following solutions were metered in simultaneously and via separate feeds as follows:
- a) an aqueous solution of 40.5 g of (c.2) in 153 g of water, over the course of 4 hours.
- b) a solution of 9.8 g of sodium peroxodisulfate in 68.0 g of water over the course of 5 h, simultaneously starting with the metered addition of (c.2).
- c) a solution of 32.9 g of acrylic acid (b.1) and 36.6 g of sodium hydroxide solution (50% strength in water), diluted with 139 g of water, over the course of 2 hours, starting 2 hours after the start of the metered addition of (c.2).

After the addition of all three solutions was completed, the reaction mixture was stirred for one hour at 80° C. Then, a solution of 0.73 g of sodium peroxodisulfate in 10.0 g of water was added and the mixture was stirred for a further 2 hours at 80° C. The mixture was then cooled to room temperature. 8 g of biocide were added and a 25.2% by weight solution of graft copolymer (B.9) was obtained.

I.10 Preparation of a Graft Copolymer (B.10)

In a stirred reactor, 237 g of maltodextrin (a.3) in 618 g of water were introduced and heated to 80° C. with stirring. At 80° C., the following solutions were metered in simultaneously and via separate feeds as follows:
- a) an aqueous solution of 41.6 g of (c.1) in 181 g of water, over the course of 4 hours.
- b) a solution of 9.85 g of sodium peroxodisulfate in 68.0 g of water over the course of 5 h, simultaneously starting with the metered addition of (c.1).
- c) a solution of 31.7 g of acrylic acid (b.1) and 35.2 g of sodium hydroxide solution (50% strength in water), diluted with 139 g of water, over the course of 2 hours, starting 2 hours after the start of the metered addition of (c.1).

After the addition of all three solutions was completed, the reaction mixture was stirred for one hour at 80° C. Then, a solution of 0.73 g of sodium peroxodisulfate in 10.0 g of water was added and the mixture was stirred for a further 2 hours at 80° C. Then, the mixture was cooled to room temperature and 8 g of biocide were added. This gave a 22.7% by weight solution of graft copolymer (B.10).

I.11 Preparation of Formulations According to the Invention (F.1, F.6, F.8.1-F.8.10) and of Comparison Formulations (C-F.2-C-F.5, C-F.7, C-F.9)

Formulations according to the invention F.1, F.6, F.8.1-F.8.10 and comparison formulations C-F.2 to C-F.5 and C-F.7 and C-F.9 were prepared by mixing the components according to table 1—with the exception of surfactant 1—in the dry state. Nonionic surfactant 1 was melted and stirred into the dry mixture and thereby distributed as homogeneously as possible. If graft copolymer (B) is in the form of an aqueous solution, then the graft copolymer (B) can either be isolated by drying and added in solid form to the other solid components or be added separately to the dishwasher in the form of a solution. The components of formulations according to the invention F.1, F.6, F.8.1-F.8.10 and comparison formulations C-F.2 to C-F.5 and also C-F.7 and C-F.9 can be found in table 1.

TABLE 1

Composition of formulation according to the invention F.1, F.6 and F.8.1, and of comparison formulations C-F.2 to C-F.5, C-F.7 and C-F.9

| | | F.1 | C-F.2 | C-F.3 | C-F.4 | C-F.5 | F.6 | C-F.7 | F.8.1 | C-F.9 | C-F.10 |
|---|---|---|---|---|---|---|---|---|---|---|---|
| (A.1) | | 35 | 35 | 35 | — | — | 35 | 35 | 10 | 10 | 10 |
| Citric acid as | | — | — | — | 35 | 35 | — | — | 35 | 35 | 35 |

TABLE 1-continued

Composition of formulation according to the invention F.1, F.6 and F.8.1, and of comparison formulations C-F.2 to C-F.5, C-F.7 and C-F.9

| Constituent [g] | F.1 | C-F.2 | C-F.3 | C-F.4 | C-F.5 | F.6 | C-F.7 | F.8.1 | C-F.9 | C-F.10 |
|---|---|---|---|---|---|---|---|---|---|---|
| trisodium salt dihydrate (B.1) | 1 | — | 1 | 1 | 1 | 1 | — | 1 | — | — |
| Polymeric builder (D.1) | 4 | 5 | 4 | 4 | 4 | — | 5 | 9 | 10 | 9 |
| Polymeric builder (D.2) | — | — | — | — | — | 4 | — | — | — | — |
| Polymeric builder C-(D.3) | — | — | — | — | — | — | — | — | — | 1 |
| (C.1) | 10.2 | 10.2 | — | 10.2 | — | 10.2 | 10.2 | 10.2 | 10.2 | 10.2 |
| Nonionic surfactant 1 | 4 | 4 | 4 | 4 | 4 | 4 | 4 | 4 | 4 | 4 |
| Nonionic surfactant 2 | 1 | 1 | 1 | 1 | 1 | 1 | 1 | 1 | 1 | 1 |
| Protease | 2.5 | 2.5 | 2.5 | 2.5 | 2.5 | 2.5 | 2.5 | 2.5 | 2.5 | 2.5 |
| Amylase | 1 | 1 | 1 | 1 | 1 | 1 | 1 | 1 | 1 | 1 |
| $Na_2Si_2O_5$ | 2 | 2 | 2 | 2 | 2 | 2 | 2 | 2 | 2 | 2 |
| TAED | 4 | 4 | 4 | 4 | 4 | 4 | 4 | 4 | 4 | 4 |
| $Na_2CO_3$ | 34.5 | 34.5 | 34.5 | 34.5 | 34.5 | 34.5 | 34.5 | 19.5 | 19.5 | 19.5 |
| HEDP | 0.81 | 0.81 | 0.81 | 0.81 | 0.81 | 0.8 | 0.8 | 0.8 | 0.8 | 0.8 |

Explanation:
(A.1): MGDA-$Na_3$, 78% by weight, remainder is water
(C.1): Sodium percarbonate, $2Na_2CO_3 \cdot 3H_2O_2$
Nonionic surfactant 1: n-$C_8H_{17}$—CH(OH)—$CH_2$—O—$(EO)_{22}$—CH($CH_3$)—$CH_2$—O—n-$C_{10}H_{21}$
Nonionic surfactant 2: n-$C_{10}H_{21}$—CH(OH)—$CH_2$—O—$(EO)_{40}$—n-$C_{10}H_{21}$
$Na_2Si_2O_5$: commercially as Britesil ® H 265 LC
HEDP: 1-Hydroxyethane-1,1-diphosphonate disodium salt
Polymeric builder (D.1): polyacrylic acid $M_w$ 4000 g/mol as sodium salt, completely neutralized
Polymeric builder (D.2): random copolymer acrylic acid/2-acrylamido-2-methylpropanesulfonic acid as sodium salt, completely neutralized, comonomer ratio 70:30 (% by weight), K value 40.
Polymeric builder C-(D.3): alternating copolymer of maleic acid and diisobutene, sodium salt, $M_w$ 12 000 g/mol, completely neutralized In formulation F.8.2 according to the invention, (B.1) was replaced by an identical amount of (B.2), i.e. 1 g. In formulation F.8.3 according to the invention, (B.1) was replaced by 1 g of (B.3). In formulation F.8.4 according to the invention, (B.1) was replaced by 1 g of (B.4). For the formulations according to the invention F.8.5 to F.8.10, mutatis mutandis applies.

II. Experiments Relating to Deposit Inhibition

Per experiment in the dishwasher, in each case 18 g of formulation according to the invention F.1, F.6, F.8.1 or one of the comparison formulations C-F.2, C-F.4, C-F.7, C-F.9 or C-F.10 were used.

TABLE 2

Results of the film formation

| | Filming on knives | Filming on glass | Filming on melamine |
|---|---|---|---|
| F.1 | 5.7 | 6.3 | 6.3 |
| C-F.2 | 5.0 | 4.0 | 5.7 |
| F.6 | 6.0 | 5.0 | 5.3 |
| C-F.7 | 4.0 | 4.0 | 4.3 |
| C-F.4 | 3.0 | 5.0 | n.d. |
| F.8.1 | 6.3 | 5.0 | 5.0 |
| C-F.9 | 6.3 | 4.0 | 4.0 |
| C-F.10 | 4.3 | 4.0 | 4.3 |

Formulations according to the invention exhibit on glass always at least grade 5 or better and consequently less of a build-up than the comparison formulations in question. This can be seen particularly clearly when comparing the filming on glass of F.8.1 and C-F.9 or C-F.10 and also of F.1 and C-F.2.

III. Experiments Relating to Detergency

Per experiment in the dishwasher, in each case 18 g of formulation according to the invention F.1 or one of the comparison formulations C-F.2 to C-F.5 were used.

The result of the detergency is summarized in tables 3 and 4 below.

TABLE 3

Result of detergency on melamine plates by differential reflectance

| Formulation | DM-21 | DM-23 | DM-93 |
|---|---|---|---|
| F.1 | 29.6 | 17.2 | 26.9 |
| C-F.2 | 25.0 | 16.1 | n.d. |
| C-F.3 | 21.1 | 10.8 | 19.1 |
| C-F.4 | 19.4 | 12.7 | 24.4 |
| C-F.5 | 16.1 | 10.8 | 21.8 |

Of the listed formulations, F.1 thus cleans the selected melamine plates the best. n.d.: not determined.

TABLE 4

Result of detergency on tea cups made of porcelain

| Formulation | Grade tea |
|---|---|
| F.1 | 8 |
| C-F.3 | 6.25 |
| C-F.4 | 5.25 |
| C-F.5 | 3.5 |

The invention claimed is:

1. A formulation comprising
   (A) at least one compound selected from methylglycine diacetate (MGDA) and glutamic acid diacetate (GLDA), and salts thereof,
   (B) at least one graft copolymer composed of
      (a) at least one graft base selected from monosaccharides, disaccharides, oligosaccharides and polysaccharides, and side chains obtainable by grafting on of
      (b) at least one ethylenically unsaturated mono- or dicarboxylic acid and
      (c) at least one ethylenically unsaturated N-containing monomer with a permanent cationic charge, and
   (C) at least one inorganic peroxide compound selected from sodium peroxodisulfate, sodium perborate and sodium percarbonate.

2. The formulation according to claim 1, wherein it the formulation is free from phosphates and polyphosphates.

3. The formulation according to claim 1, wherein compound (c) is selected from (meth)acrylamidopropyltrimethylammonium chloride.

4. The formulation according to claim 1, wherein compound (A) is selected from the trisodium salt of methylglycine diacetate (MGDA).

5. The formulation according to claim 1, wherein the formulation is solid at room temperature.

6. The formulation according to claim 1, wherein the formulation comprises at least one polymeric builder (D).

7. The formulation according to claim 1, wherein the formulation comprises sodium citrate.

8. The formulation according to claim 1, wherein the formulation comprises in the range from 0.1 to 10% by weight of water.

9. The formulation according to claim 1, wherein the formulation comprises:
   in total in the range from 1 to 50% by weight of compound (A),
   in total in the range from 0.1 to 4% by weight of graft copolymer (B), and
   in the range from 1 to 20% by weight of peroxide (C), based in each case on solids content of the formulation in question.

10. A process for washing dishes and kitchen utensils, the process comprising washing said dishes and kitchen utensils using the formulation according to claim 1.

11. A process for washing objects which have at least one surface made of glass wherein the glass is one of decorated and undecorated, the process comprising washing said objects using the formulation according to claim 1.

12. The process according to claim 10, wherein the washing comprises washing using a dishwasher.

13. A process for the preparation of formulations according to claim 1, wherein at least one compound (A), at least one graft copolymer (B) and at least one peroxide (C) are mixed together in one or more steps.

14. The process according to claim 13, wherein water is at least partially removed from the formulation after mixing.

15. The process according to claim 14, wherein the water is removed by spray drying.

* * * * *